(12) United States Patent
Okochi et al.

(10) Patent No.: US 11,637,465 B2
(45) Date of Patent: Apr. 25, 2023

(54) ROTOR OF ROTATING MACHINE AND MANUFACTURING METHOD OF ROTOR OF ROTATING MACHINE

(71) Applicant: TOYOTA JIDOSHA KABUSHIKI KAISHA, Toyota (JP)

(72) Inventors: Toshinori Okochi, Toyota (JP); Keisuke Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 17/351,684

(22) Filed: Jun. 18, 2021

(65) Prior Publication Data
US 2022/0006338 A1 Jan. 6, 2022

(30) Foreign Application Priority Data
Jul. 1, 2020 (JP) .............................. JP2020-114446

(51) Int. Cl.
*H02K 1/27* (2022.01)
*H02K 15/03* (2006.01)
*H02K 1/276* (2022.01)

(52) U.S. Cl.
CPC ............. *H02K 1/276* (2013.01); *H02K 15/03* (2013.01)

(58) Field of Classification Search
CPC ........... H02K 1/04; H02K 1/276; H02K 15/03
USPC .................................................... 310/156.56
See application file for complete search history.

(56) References Cited

U.S. PATENT DOCUMENTS

| | | | | |
|---|---|---|---|---|
| 5,936,323 | A * | 8/1999 | Shibukawa | H02K 15/03 310/43 |
| 9,484,790 | B2 * | 11/2016 | Takahashi | H02K 9/223 |
| 9,859,761 | B2 * | 1/2018 | Yamada | H02K 1/2713 |
| 9,960,646 | B2 * | 5/2018 | Sasajima | H02K 1/27 |
| 10,020,700 | B2 * | 7/2018 | Fubuki | H02K 1/2766 |
| 2016/0315512 | A1 * | 10/2016 | Fubuki | H02K 1/276 |
| 2019/0109525 | A1 * | 4/2019 | Gangi | H02K 15/12 |
| 2019/0199148 | A1 * | 6/2019 | Hattori | H02K 1/04 |
| 2019/0260277 | A1 * | 8/2019 | Ikemoto | H02K 1/22 |

FOREIGN PATENT DOCUMENTS

JP 11-355986 A 12/1999

* cited by examiner

*Primary Examiner* — Alex W Mok
(74) *Attorney, Agent, or Firm* — Oblon, McClelland, Maier & Neustadt, L.L.P.

(57) ABSTRACT

A rotor of a rotating machine includes a rotor core in which a plurality of assembly holes is provided in an axial direction, and a first magnet and a second magnet. The first magnet and the second magnet are assembled to the rotor core by being inserted into the assembly holes in accordance with a predetermined arrangement pattern. An outer peripheral surface of any one of the first magnet and the second magnet, including end faces in the axial direction, being entirely covered with an insulating coating, and an outer peripheral surface of the other of the first magnet and the second magnet, excluding at least a part of end faces in the axial direction, being covered with an insulating coating.

8 Claims, 5 Drawing Sheets

ROTOR OF ROTATING MACHINE AND MANUFACTURING METHOD OF ROTOR OF ROTATING MACHINE

CROSS-REFERENCE TO RELATED APPLICATION

This application claims priority to Japanese Patent Application No. 2020-114446 filed on Jul. 1, 2020, incorporated herein by reference in its entirety.

BACKGROUND

1. Technical Field

The present disclosure relates to a rotor of a rotating machine and a manufacturing method of the rotor of the rotating machine.

2. Description of Related Art

A rotor of a rotating machine including a rotor core and two types of magnets, namely, a first magnet and a second magnet, is known. The rotor core is provided with a plurality of assembly holes provided in an axial direction. The first magnet and the second magnet are inserted into the assembly holes in accordance with a predetermined arrangement pattern and assembled to the rotor core. A rotor described in Japanese Unexamined Patent Application Publication No. 11-355986 (JP 11-355986 A) is an example of the rotor above. In order to suppress erroneous assembly of two types of magnets, namely, the first magnet and the second magnet, a sectional shape of the first magnet and a sectional shape of the second magnet are designed to be asymmetric to each other when turned by 180 degrees, and two types of assembly holes each having asymmetric sectional shape when turned by 180 degrees are provided for the rotor.

SUMMARY

However, the sectional shapes of the two types of magnets and the assembly holes need to be asymmetric when turned by 180 degrees. Therefore, two types of magnets having the same sectional shape cannot be adopted, which places restriction on flexibility of shape design.

The present disclosure provides a rotor of a rotating machine and a manufacturing method of the rotor of the rotating machine to which, even when two types of magnets having the same sectional shape, that is, a first magnet and a second magnet, are used, the first magnet and the second magnet can be appropriately distinguished from each other and assembled.

A rotor of a rotating machine according to a first aspect of the present disclosure includes a rotor core in which a plurality of assembly holes is provided in an axial direction, and a first magnet and a second magnet. The first magnet and the second magnet are assembled to the rotor core by being inserted into the assembly holes in accordance with a predetermined arrangement pattern. An outer peripheral surface of any one of the first magnet and the second magnet, including end faces in the axial direction, being entirely covered with an insulating coating, and an outer peripheral surface of the other of the first magnet and the second magnet, excluding at least a part of end faces in the axial direction, being covered with an insulating coating.

In the rotor of the rotating machine according to the first aspect of the present disclosure, any one of the first magnet and the second magnet is covered with the insulating coating including the end faces. On the contrary, the end faces of the other of the first magnet and the second magnet are not covered at least partially with the insulating coating. Therefore, the first magnet and the second magnet can be distinguished from each other based on a difference in an electrical resistance caused by whether the insulating coating is provided by bringing an electrode into contact with a portion of the end faces of the magnets and measuring the electrical resistance. Accordingly, even when the two types of magnets, namely, the first magnet and the second magnet, have the same sectional shape, the first magnet and the second magnet can be appropriately distinguished from each other and assembled to the rotor core, which eliminates restrictions such as the sectional shapes of the first magnet and the second magnet.

A manufacturing method of a rotor of a rotating machine according to a second aspect of the present disclosure includes preparing and distinguishing. The rotor of the rotating machine includes a rotor core in which a plurality of assembly holes is provided in an axial direction, and two types of magnets including a first magnet and a second magnet, assembled to the rotor core by being inserted into the assembly holes in accordance with a predetermined arrangement pattern. The preparing is preparing the first magnet and the second magnet, each of an outer peripheral surface of the first magnet and an outer peripheral surface of the second magnet being covered with an insulating coating such that the outer peripheral surface of one magnet, including end faces in the axial direction, is entirely covered with the insulating coating and the outer peripheral surface of the other magnet is covered with the insulating coating excluding at least a part of end faces in the axial direction, the one magnet being one of the first magnet and the second magnet and the other magnet being the other of the first magnet and the second magnet. The distinguishing is distinguishing the first magnet and the second magnet from each other based on a difference in an electrical resistance caused by whether the insulating coating is provided by bringing an electrode into contact with a portion of the end faces in the axial direction, the portion of the end faces being covered with the insulating coating for the one magnet but not covered with the insulating coating for the other magnet, and measuring the electrical resistance, for both of the first magnet and the second magnet.

In the manufacturing method of the rotor of the rotating machine according to the second aspect of the present disclosure, the first magnet and the second magnet are prepared with their outer peripheral surfaces covered with the insulating coatings such that any one of the first magnet and the second magnet is covered with the insulating coating including the end surfaces and the other of the first magnet and the second magnet is covered with the insulating coating excluding at least a part of the end faces. The electrode is brought into contact with a portion of the end faces of the magnets to measure the electrical resistance, whereby the first magnet and the second magnet are distinguished from each other based on the difference in the electrical resistance caused by whether the insulating coating is provided. Accordingly, even when the two types of magnets, namely, the first magnet and the second magnet, have the same sectional shape, the first magnet and the second magnet can be appropriately distinguished from each other and assembled to the rotor core, which eliminates restrictions such as the sectional shapes of the first magnet and the second magnet.

The manufacturing method according to the second aspect of the present disclosure may include inserting the first magnet and the second magnet into the assembly holes in accordance with the predetermined arrangement pattern based on a distinguishing result obtained by the distinguishing.

In the manufacturing method according to the second aspect of the present disclosure, the first magnet and the second magnet are inserted into the assembly holes in accordance with the arrangement pattern based on the distinguishing result in the distinguishing, whereby the first magnet and the second magnet are appropriately assembled to the rotor core.

The manufacturing method according to the second aspect of the present disclosure may further include replacing. The distinguishing may be performed in a state where the first magnet and the second magnet are inserted into the assembly holes of the rotor core, and include distinguishing whether the first magnet and the second magnet are respectively inserted into the assembly holes in accordance with the predetermined arrangement pattern. The replacing may be replacing, with a magnet that is appropriate, the first magnet or the second magnet that is distinguished that it is not inserted into one of the assembly holes in accordance with the predetermined arrangement pattern in the distinguishing.

In the manufacturing method according to the second aspect of the present disclosure, the distinguishing is performed in a state where the first magnet and the second magnet are assembled in the assembly holes of the rotor core, and whether the first magnet and the second magnet are inserted into the respective assembly holes in accordance with the arrangement pattern is distinguished. Subsequently, the first magnet or the second magnet that is distinguished as not inserted in the corresponding one of the assembly holes in accordance with the arrangement pattern is replaced with the appropriate magnet. Therefore, erroneous assembly of the first magnet and the second magnet can be appropriately suppressed.

In the manufacturing method according to the second aspect of the present disclosure, the preparing may include adhering the insulating coating to the outer peripheral surface of each of the first magnet and the second magnet such that the insulating coating is not adhered to at least a part of the end faces of the other magnet, of the first magnet and the second magnet, in the axial direction.

In the preparing in the manufacturing method of the rotor of the rotating machine according to the second aspect of the present disclosure, the insulating coatings are applied to the outer peripheral surfaces of the first magnet and the second magnet such that the insulating coating is not applied to at least a part of the end faces of, in the axial direction, the other magnet of the first magnet and the second magnet, whereby, in the distinguishing following the preparing, the first magnet and the second magnet can be appropriately distinguished from each other based on whether the insulating coating is provided on the end faces in the axial direction.

In the manufacturing method of the rotor of the rotating machine according to the second aspect of the present disclosure, the preparing may include removing at least a part of the insulating coating on the end faces in the axial direction, of the other magnet of the first magnet and the second magnet having the outer peripheral surface that is entirely covered with the insulating coating.

In the preparing of the manufacturing method according to the second aspect of the present disclosure, the insulating coating of at least a part of the end faces of, in the axial direction, the other magnet of the first magnet and the second magnet of which outer peripheral surfaces are entirely covered with the insulating coatings, is removed, whereby the first magnet and the second magnet can be appropriately distinguished from each other based on whether the insulating coating is provided on the end faces in the axial direction in the distinguishing following the preparing.

In the manufacturing method according to the second aspect of the present disclosure, the first magnet and the second magnet may have the same sectional shape orthogonal to the axial direction, and the assembly holes may have the same sectional shape.

In the manufacturing method according to the second aspect of the present disclosure, the sectional shapes of the first magnet and the second magnet orthogonal to the axial direction are the same and thus the first magnet and the second magnet cannot be distinguished from each other based on the sectional shape. Therefore, there is a possibility of erroneous assembly. However, the first magnet and the second magnet are distinguished from each other based on the difference in the electrical resistance caused by whether the insulating coating is provided on the end faces in the axial direction, whereby the first magnet and the second magnet can be appropriately assembled to the rotor core while suppressing erroneous assembly.

In the manufacturing method according to the second aspect of the present disclosure, the assembly holes may include two types of assembly holes including a first assembly hole and a second assembly hole. The first assembly hole and the second assembly hole may have mutually different postures with respect to a radial direction of the rotor core and are provided adjacent to each other in a circumferential direction of the rotor core. A plurality of sets of the first assembly hole and the second assembly hole may be provided around a rotation axis of the rotor core. The first magnet may be inserted into the first assembly hole, and the second magnet may be inserted into the second assembly hole.

Further, in the manufacturing method according to the second aspect of the present disclosure, the sets of two types of assembly holes, namely, the first assembly hole and the second assembly hole, having different postures with respect to the radial direction of the rotor core are provided around the rotation axis of the rotor core. The first magnet is inserted into each of the first assembly hole and the second magnet is inserted into each of the second assembly hole. Therefore, a large number of the first magnets and the second magnets need to be assembled. Accordingly, an explicit effect in which distinguishing the first magnet and the second magnet from each other based on the difference in the electrical resistance caused by whether the insulating coating is provided on the end faces in the axial direction makes it possible to appropriately assemble the first magnet and the second magnet to the rotor core while suppressing erroneous assembly can be obtained.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

The present disclosure is applied to, for example, a rotor of a permanent magnet embedded synchronous motor. However, the present disclosure may be applied to a rotor of other types of rotating machines in which two types of magnets, namely, a first magnet and a second magnet, are embedded. The rotating machine may be a rotating machine used as an electric motor, a rotating machine used as a generator, or a motor generator used as both the electric motor and the generator. The rotor may be an inner rotor type disposed on an inner peripheral side, or may be an outer rotor type disposed on an outer peripheral side. As the first magnet and the second magnet, for example, a rare earth magnet may be used. However, other permanent magnets may also be used. As an insulating coating of the magnets, for example, resin or an oxide film may be used. The present disclosure can be applied to a rotor provided with other magnets, such as a third magnet, in addition to the first magnet and the second magnet.

When the two types magnets, namely, the first magnet and the second magnet, have the same sectional shape orthogonal to the axial direction of the rotor core and the sectional shapes of a plurality of assembly holes are all the same, the present disclosure may be applied to the magnets having the same outer shape including the sectional shape and having different characteristics such as magnetic flux, a holding force, and polarity, for example. In addition to the above, the present disclosure may also be applied to a case where there is no possibility of erroneous assembly because, for example, the sectional shape of the first magnet and the sectional shape of the second magnet differ from each other, or the sectional shape of the first assembly hole for the first magnet and the sectional shape of the second assembly hole for the second magnet are different from each other. That is, when the first magnet and the second magnet are inserted into the first assembly hole and the second assembly hole, respectively, based on a distinguishing result in a distinguishing step, the first magnet and the second magnet are distinguished from each other in the distinguishing step, whereby the first magnet and the second magnet are inserted into the target assembly holes promptly without trial and error.

Hereinafter, an embodiment of the present disclosure will be described in detail with reference to the drawings. Note that, in the following embodiment, the drawings are appropriately simplified or modified for convenience of description, and the dimensional ratios and shapes of the respective parts are not necessarily drawn accurately.

Figure 1:
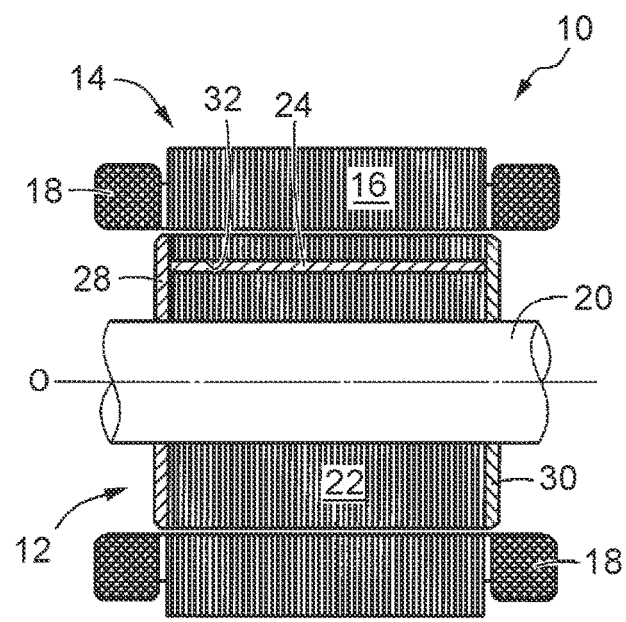
FIG. 1 is a diagram illustrating a rotating machine provided with a rotor to which the present disclosure is applied, and is a sectional view taken along a line I-I shown in FIG. 2.
Figure 2:
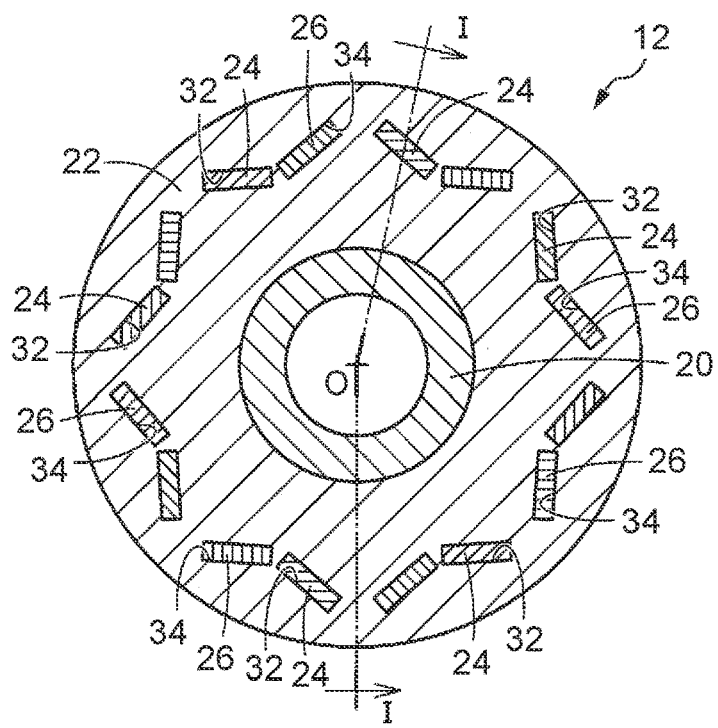
FIG. 2 is a sectional view orthogonal to a rotation axis O of the rotor of the rotating machine shown in FIG. 1, and a view enlarged as compared with FIG. 1.

FIG. 1 is a view for explaining a rotating machine 10 provided with a rotor 12 to which the present disclosure is applied, and is a sectional view taken along a line I-I shown in FIG. 2. FIG. 2 is a sectional view that is orthogonal to a rotation axis O of the rotor 12, and is an enlarged view compared to FIG. 1. The rotating machine 10 is a permanent magnet embedded synchronous motor, and is a motor generator that can be selectively used as an electric motor and a generator. The rotating machine 10 may be used as a driving force source for an electric vehicle including a hybrid vehicle, for example. The rotating machine 10 includes the rotor 12 and a stator 14 that are provided concentrically with the rotation axis O. The stator 14 includes a cylindrical stator core 16 disposed on an outer peripheral side of the rotor 12 and a plurality of stator coils 18 wound around the stator core 16. The stator core 16 is configured by stacking a large number of ring-shaped steel plates in a direction parallel to the rotation axis O, and is fixed to a case (not shown) by press fitting or mounting bolts, for example.

The rotor 12 includes a cylindrical rotor core 22 attached to an outer peripheral surface of a rotor shaft 20, and a large number of the first magnets 24 and the second magnets 26 embedded in the rotor core 22. An axis of the rotor shaft 20 coincides with the rotation axis O. The rotor core 22 is configured by stacking a large number of ring-shaped steel plates in the direction parallel to the rotation axis O, and is provided with a pair of end plates 28, 30 at respective end portions thereof and fixed to the rotor shaft 20. The rotor core 22 is provided with two types of assembly holes, that is, first assembly holes 32 and second assembly holes 34, each of which penetrates the rotor core 22 in an axial direction (the direction parallel to the rotation axis O). The first magnets 24 are each inserted into the first assembly hole 32 and fixed by a resin adhesive, etc. The second magnets 26 are each inserted into the second assembly hole 34 and fixed using a resin adhesive, etc.

As is clear from FIG. 2, the first assembly holes 32 and second assembly holes 34 each have a rectangular sectional shape that is orthogonal to the axial direction of the rotor core 22 and have the same shape. However, the first assembly hole 32 is inclined clockwise with respect to a direction orthogonal to a radial direction of the rotor core 22, and the second assembly hole 34 is inclined counterclockwise with respect to the direction orthogonal to the radial direction of the rotor core 22. That is, a set of the first assembly hole 32 and the second assembly hole 34 adjacent to each other in a circumferential direction of the rotor core 22 is provided so as to form a shallow V shape that opens toward the outer peripheral side. A plurality of sets (eight sets in the present embodiment) of the first assembly hole 32 and the second assembly hole 34 is provided around the rotation axis O at equal angular intervals (by 45 degrees in the present embodiment) with the V-shaped arrangement of the first assembly hole 32 and the second assembly hole 34 as a basic pattern. Therefore, a plurality of the first magnets 24 and a plurality of the second magnets 26 (8 in the present embodiment, respectively) are disposed in accordance with an arrangement pattern determined by the first and second assembly holes 32, 34.

Figure 3:
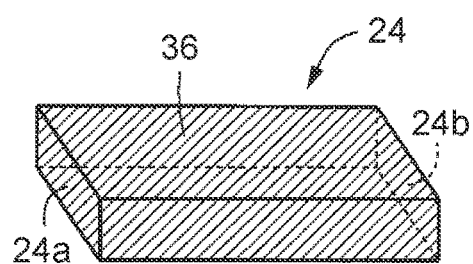
FIG. 3 is a perspective view illustrating a first magnet assembled to the rotor shown in FIG. 2.
Figure 4:
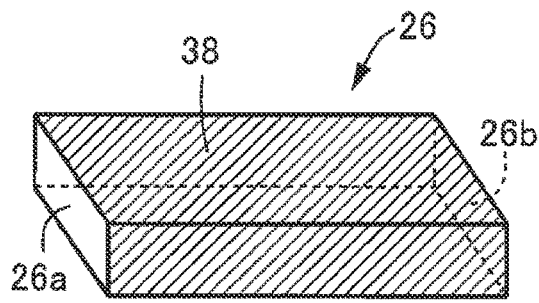
FIG. 4 is a perspective view illustrating a second magnet assembled to the rotor shown in FIG. 2.

The first magnet 24 and the second magnet 26 that are inserted into the first assembly hole 32 and the second assembly hole 34, respectively and are assembled to the rotor core 22 have a length substantially equal to an axial length of the rotor core 22, and have a sectional shape orthogonal to the axial direction that is a longitudinal direction thereof to be a rectangular that matches the first and second assembly holes 32, 34. The first magnet 24 and the second magnet 26 have a rectangular parallelepiped shape in which the sectional shape and the outer peripheral shape are identical. FIG. 3 is a perspective view of the first magnet 24, and FIG. 4 is a perspective view of the second magnet 26. The first magnet 24 and the second magnet 26 both have a rectangular flat plate shape that is elongate in the axial direction. The first magnet 24 and the second magnet 26 are assembled in the first assembly hole 32 and the second assembly hole 34 in a posture in which polarities of front and back surfaces of the flat plate shape are opposite to each other. For example, the first magnet 24 is assembled in the first assembly hole 32 in a posture in which a surface on the north (N) pole side is located on the outer peripheral side of the rotor core 22, and the second magnet 26 is assembled in the second assembly hole 34 in a posture in which a surface on the south (S) pole side is located on the outer peripheral side of the rotor core 22. The polarities of the first magnet 24 and the second magnet 26 may be opposite. Further, as the first magnet 24 and the second magnet 26, for example, a rare earth magnet may be used, and direct contact with the rotor core 22 may impair the performance of the rotating machine 10. Therefore, the first magnet 24 and the second magnet 26 are respectively covered with insulating coatings 36, 38 such as resin and oxide films.

Here, the first magnet 24 and the second magnet 26 have mutually different characteristics such as magnetic flux and holding force. The difference in the characteristics between the first and the second magnets 24, 26 above cannot be distinguished from each other based on the outer peripheral shape. Therefore, in the present embodiment, the first magnet 24 and the second magnet 26 can be distinguished from each other based on the insulating coatings 36, 38 provided on the outer peripheral surfaces. The diagonal lines in FIGS. 3 and 4 represent the insulating coatings 36, 38. In FIG. 3, the insulating coating 36 is provided to cover the entire outer peripheral surface of the first magnet 24, including end faces 24a, 24b on respective sides of the first magnet 24 in the axial direction. On the contrary, in FIG. 4, the insulating coating 38 is provided to cover the outer peripheral surface of the second magnet 26 excluding end faces 26a, 26b on respective sides of the second magnet 26 in the axial direction. The insulating coatings 36, 38 can be adhered using, for example, a physical method such as coating or dipping or an electrochemical method. The second magnet 26 can be coated with masking applied to the end faces 26a, 26b such that the coating does not adhere. Further, the insulating coating 38 on the end faces 26a, 26b of the second magnet 26 may be removed using a physical method such as a grinder or a chemical method after the insulating coating 38 is adhered to the entire outer peripheral surface of the second magnet 26 including the end faces 26a, 26b. In the present embodiment, substantially the entire areas of both of the end faces 26a, 26b of the second magnet 26 are exposed to the outside. However, the insulating coating 38 may not be provided only on part of the end faces 26a, 26b. The insulating coating 38 may be omitted because the end faces 26a, 26b are not likely to come into contact with the rotor core 22. In the present embodiment, the first magnet 24 is an example of one magnet and the second magnet 26 is an example of the other magnet.

In the rotor 12 of the rotating machine 10 described above, the first magnet 24 that is one of the first magnet 24 and the second magnet 26 is covered with the insulating coating 36 including the end faces 24a, 24b. On the contrary, the end faces 26a, 26b of the second magnet 26 that is the other magnet are not covered with the insulating coating 38. Therefore, whether the magnet is the first magnet 24 or the second magnet 26 can be distinguished based on a difference in an electrical resistance caused by whether the insulating coatings 36, 38 are provided by bring an electrode into contact with the end faces 24a, 24b of the first magnet 24 and the end faces 26a, 26b of the second magnet 26 and measuring the electrical resistance. Accordingly, even when the two types of magnets, namely, the first magnet 24 and the second magnet 26, have the same sectional shape and outer peripheral shape, the first magnet 24 and the second magnet 26 can be appropriately distinguished from each other and assembled in the first assembly hole 32 and the second assembly hole 34 of the rotor core 22, respectively, which eliminates restrictions such as the sectional shapes of the first magnet 24 and the second magnet 26.

Further, in the present embodiment, the sectional shape orthogonal to the axial direction and the outer peripheral shapes of the first magnet 24 and the second magnet 26 are the same, and thus the first magnet 24 and the second magnet 26 cannot be distinguished from each other based on the sectional shape and the outer peripheral shape. Therefore, there is still a possibility of erroneous assembly. Therefore, elimination of the insulating coating 38 on the end faces 26a, 26b of the second magnet 26 makes it possible to distinguish the first magnet 24 and the second magnet 26 from each other based on the difference in the electrical resistance caused by whether the insulating coatings 36, 38 are provided. This further makes it possible to appropriately assemble the first magnet 24 and the second magnet 26 to the rotor core 22 while suppressing erroneous assembly.

Further, in the present embodiment, the sets of the first assembly hole 32 and the second assembly hole 34 having different postures with respect to the radial direction of the rotor core 22 are provided around the rotation axis O of the rotor core 22, and the first magnet 24 is inserted into each of the first assembly hole 32 and the second magnet 26 is inserted into each of the second assembly hole 34. Therefore, a large number of the first magnets 24 and the second magnets 26 need to be assembled. Accordingly, an explicit effect in which elimination of the insulating coating 38 on the end faces 26a, 26b of the second magnet 26 makes it possible to distinguish the first magnet 24 and the second magnet 26 from each other based on the difference in the electrical resistance caused by whether the insulating coatings 36, 38 are provided, which further makes it possible to appropriately assemble the first magnet 24 and the second magnet 26 to the rotor core 22 while suppressing erroneous assembly can be obtained.

Next, an example of a manufacturing procedure of the rotor 12 of the rotating machine 10 will be specifically described with reference to FIG. 5. All of steps S1 to S3 in a flowchart shown in FIG. 5 can be performed manually by humans. However, some or all of steps S1 to S3 may be automatically performed using a machine. In the present embodiment, step S1 is a preliminary step (preparing), step S2 is a distinguishing step (distinguishing), and step S3 is an insertion step (inserting).

In step S1, as shown in FIGS. 3 and 4, two types of magnets, namely, the first magnet 24 and the second magnet 26, having different coating states using the insulating coatings 36, 38, are prepared. That is, the first magnet 24 is provided with the insulating coating 36 covering the entire outer peripheral surface of the first magnet 24 including the end faces 24a, 24b in the axial direction. The second magnet 26 is provided with the insulating coating 38 covering the outer peripheral surface of the second magnet 26 excluding the end faces 26a, 26b in the axial direction. The end faces 26a, 26b are exposed to the outside.

Figure 6:
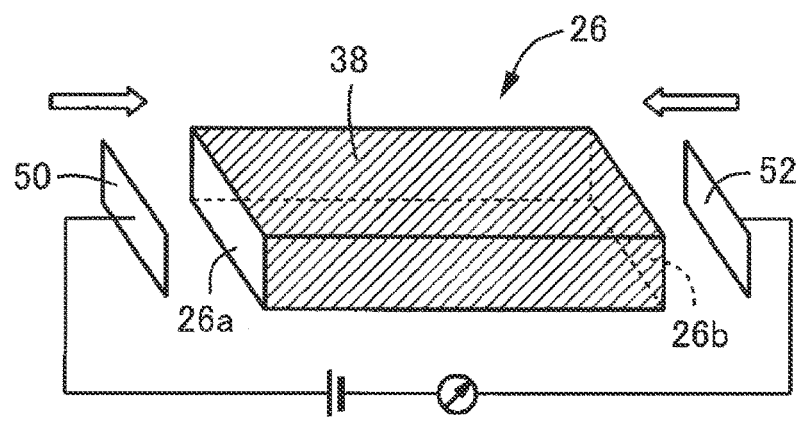
FIG. 6 is a diagram illustrating an example of a measurement method for measuring an electrical resistance of a large number of magnets in step S2 shown in FIG. 5.
Figure 7:
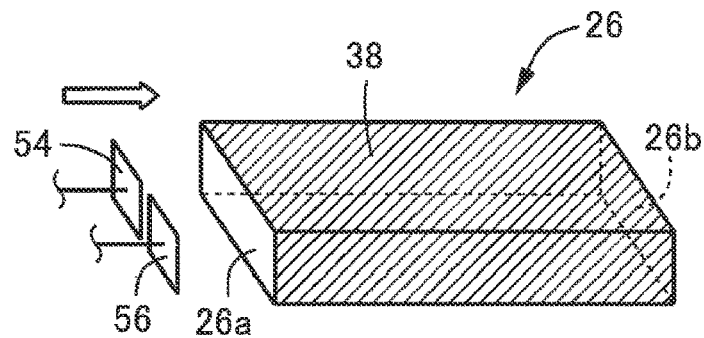
FIG. 7 is a diagram illustrating another example of a measurement method for measuring the electrical resistance of a large number of magnets in step S2 shown in FIG. 5.

In step S2, the electrical resistance is measured by bringing the electrodes into contact with the end faces 24a, 24b of the first magnet 24 and the end faces 26a, 26b of the second magnet 26 and whether the magnet is the first magnet 24 or the second magnet 26 can be distinguished based on the difference in the electrical resistance caused by whether the insulating coatings 36, 38 are provided. FIGS. 6 and 7 are views for specifically explaining a method for measuring the electric resistance, both of which are cases where the electrical resistance of the second magnet 26 is measured. However, the electrical resistance of the first magnet 24 can also be measured in the same manner. In FIG. 6, a pair of electrodes 50, 52 is provided. The electrodes 50, 52 are respectively brought into contact with the end faces 26a, 26b on the respective sides of the second magnet 26 to measure the electrical resistance. The electrical resistance of the second magnet 26 without the insulating coating 38 on the end faces 26a, 26b is smaller than the electrical resistance of the first magnet 24 in which the end faces 24a, 24b are covered with the insulating coating 36. On the basis of this, whether the magnet is the first magnet 24 or the second magnet 26 can be distinguished based on the difference in the electrical resistance. FIG. 7 shows a case where a pair of electrodes 54, 56 is provided, and the electrodes 54, 56 are brought into contact with one of the end faces 26a, 26b (the end face 26a in FIG. 7) of the second magnet 26 to measure the electrical resistance. Also in this case, similar to the case shown in FIG. 6, whether the magnet is the first magnet 24 or the second magnet 26 can be distinguished based on the difference in the electrical resistance. In the case shown in FIG. 7, the end face 26b that is the other end face may be provided with the insulating coating 38. Note that, a current value that varies in accordance with the electrical resistance may be measured and compared.

In step S3, the first magnets 24 and the second magnets 26 are inserted into the first assembly holes 32 and the second assembly holes 34 in accordance with the predetermined arrangement pattern based on a distinguishing result in step S2. That is, the first magnets 24 are each inserted into the first assembly hole 32, and the second magnets 26 are each inserted into the second assembly hole 34. The first assembly holes 32 and the second assembly holes 34 are provided in accordance with the predetermined arrangement pattern. After that, the first magnets 24 and the second magnets 26 are fixed to the rotor core 22 using a resin adhesive, etc., whereby the target rotor 12 is manufactured. In the insertion step in step S3, when the first magnets 24 and the second magnets 26 are inserted into the first assembly holes 32 and the second assembly holes 34, the first and second magnets 24, 26 can be fixed to the rotor core 22 using a resin adhesive, etc. at the same time.

According to the manufacturing method of the rotor 12, the first magnet 24 and the second magnet 26 of which outer peripheral surfaces are covered with the insulating coatings 36, 38, respectively, are prepared such that the first magnet 24 that is one of the first magnet 24 and the second magnet 26 is covered with the insulating coating 36 including the end faces 24a, 24b, and the second magnet 26 that is the other magnet is covered with the insulating coating 38 excluding the end faces 26a, 26b. The electrodes 50, 52 or the electrodes 54, 56 are brought into contact with the end faces 24a, 24b of the first magnet 24 and the end faces 26a, 26b of the second magnet 26 and the electrical resistance is measured, whereby whether the magnet is the first magnet 24 or the second magnet 26 is distinguished based on the difference in the electrical resistance caused by whether the insulating coatings 36, 38 are provided. Accordingly, even when the two types of magnets, namely, the first magnet 24 and the second magnet 26, have the same sectional shape and outer peripheral shape, the first magnet 24 and the second magnet 26 can be appropriately distinguished from each other and assembled to the rotor core 22, which eliminates the restrictions such as the sectional shapes of the first magnet 24 and the second magnet 26.

Further, the first magnet 24 and the second magnet 26 are inserted into the first assembly hole 32 and the second assembly hole 34, respectively, based on the distinguishing result in the distinguishing step in step S2. Therefore, the first magnet 24 and the second magnet 26 are assembled to the rotor core 22 promptly without trial and error.

Further, the sectional shapes of the first magnet 24 and the second magnet 26 orthogonal to the axial direction are the same and thus the first magnet 24 and the second magnet 26 cannot be distinguished from each other based on the sectional shape. Therefore, there is a possibility of erroneous assembly. However, the first magnet 24 and the second magnet 26 are distinguished from each other based on the difference in the electrical resistance caused by whether the insulating coatings 36, 38 are provided on the end faces 24a, 24b, 26a, 26b in the axial direction, whereby the first magnet 24 and the second magnet 26 can be appropriately assembled to the rotor core 22 while suppressing erroneous assembly.

Further, the sets of the first assembly hole 32 and the second assembly hole 34 having different postures with respect to the radial direction of the rotor core 22 are provided around the rotation axis O of the rotor core 22, and the first magnet 24 is inserted into each of the first assembly hole 32 and the second magnet 26 is inserted into each of the second assembly hole 34. Therefore, a large number of the first magnets 24 and the second magnets 26 need to be assembled. Accordingly, an explicit effect in which distinguishing the first magnet 24 from the second magnet 26 based on the difference in the electrical resistance caused by whether the insulating coatings 36, 38 are provided on the end faces 24a, 24b, 26a, 26b in the axial direction makes it possible to appropriately assemble the first magnet 24 and the second magnet 26 to the rotor core 22 while suppressing erroneous assembly can be obtained.

Figure 8:
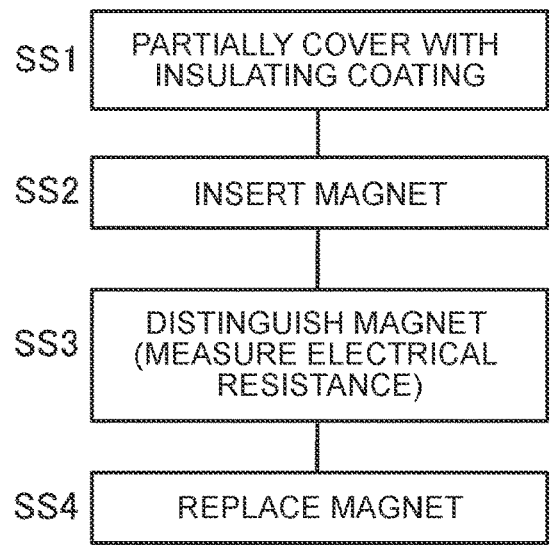
FIG. 8 is a flowchart explaining another example of the manufacturing procedure of the rotor of the rotating machine shown in FIG. 1.

The flowchart shown in FIG. 8 is a diagram illustrating another example of the manufacturing procedure of the rotor 12 of the rotating machine 10. Also in this case, all of steps SS1 to SS4 can be performed manually by humans. However, some or all of steps SS1 to SS4 may be automatically performed using a machine. In the present embodiment, step SS1 is a preliminary step (preparing), step SS2 is an insertion step (inserting), step SS3 is a distinguishing step (distinguishing), and step SS4 is a replacement step (replacing).

Figure 5:
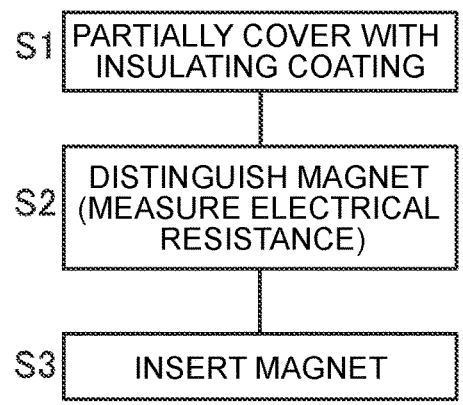
FIG. 5 is a flowchart explaining a manufacturing procedure of the rotor of the rotating machine shown in FIG. 1.

In step SS1, as shown in FIGS. 3 and 4, two types of magnets, namely, the first magnet 24 and the second magnet 26, having different coating states using the insulating coatings 36, 38, are prepared similar to step S1 in FIG. 5. In SS2, the first magnet 24 and the second magnet 26 are inserted into the first assembly hole 32 and the second assembly hole 34 provided in accordance with the predetermined arrangement pattern.

Figure 9:
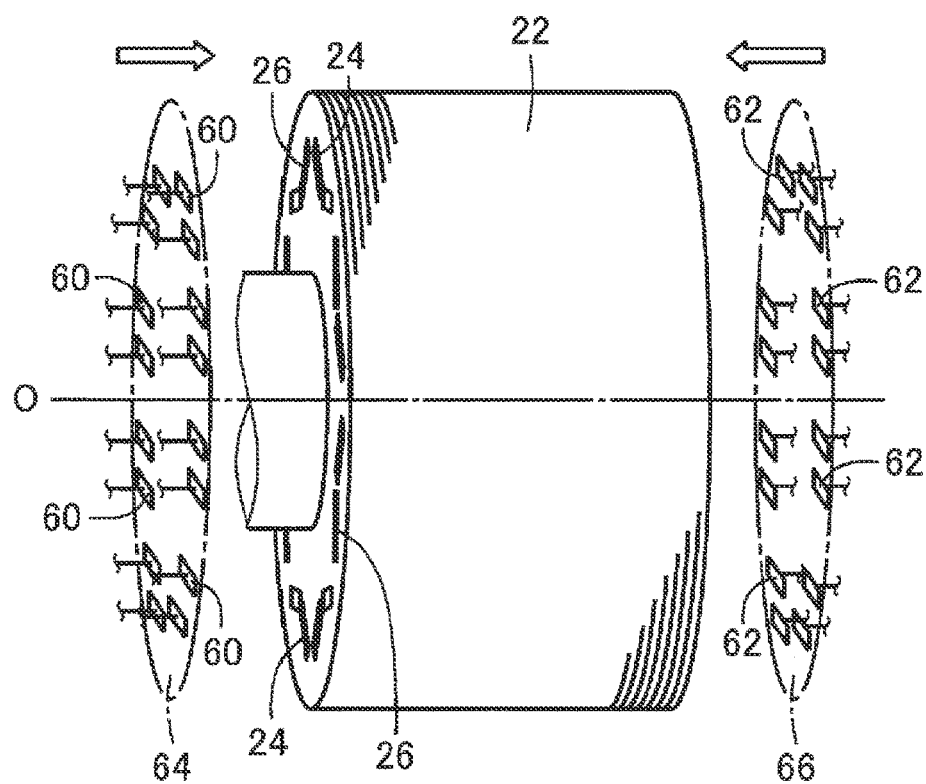
FIG. 9 is a diagram illustrating an example of the measurement method for measuring the electrical resistance of a large number of magnets inserted into a large number of assembly holes of the rotor core in step SS3 shown in FIG. 8.

Here, the first magnet 24 and the second magnet 26 have the same sectional shape and outer peripheral shape. Therefore, there is a possibility that erroneous assembly in which the second magnet 26 is inserted into the first assembly hole 32 or the first magnet 24 is inserted into the second assembly hole 34 may occur. Therefore, step SS3 is subsequently executed so as to distinguish whether the magnet is the first magnet 24 or the second magnet 26 based on the difference in the electrical resistance caused by whether the insulating coatings 36, 38 are provided by bringing the electrodes into contact with the end faces 24a, 24b, 26a, 26b of the first magnets 24 and the second magnets 26 inserted into a large number of the assembly holes 32, 34, and measuring the electrical resistance. That is, whether the magnet inserted into the first assembly hole 32 is the first magnet 24 and the magnet inserted into the second assembly hole 34 is the second magnet 26 is distinguished. Here, similar to step S2, the electrical resistances of a large number of (16 in the present embodiment) the first and second magnets 24, 26 inserted into the assembly holes 32, 34 of the rotor core 22 using the electrodes 50, 52, or 54, 56 shown in FIG. 6 or FIG. 7 may be measured one by one. However, as shown in FIG. 9, for example, whether the magnet is the first magnet 24 or the second magnet 26 may be distinguished by measuring the electrical resistances of all the first and second magnets 24, 26 at the same time using a pair of electrode holding plates 64, 66 to which a large number of (16 in the present embodiment) the electrodes 60, 62 are attached corresponding to the number of the first and second magnets 24, 26. Note that, it is not always necessary to be able to measure the electric resistances of all of the first and second magnets 24, 26 at the same time. For example, the number of electrodes 60 and the number of electrodes 62 may be set to about 2 to 4 and the electrical resistance may be measured multiple times. Further, providing the electrodes 60, 62 on one of the electrode holding plates 64, 66 makes it possible to omit the other of the electrode holding plates 64, 66 by measuring the electrical resistance only on one side in the axial direction as shown in FIG. 7.

In the next step SS4, based on the distinguishing result in step SS3, when the magnet inserted in the first assembly hole 32 is determined to be the second magnet 26, and when the magnet inserted into the second assembly hole 34 is determined to be the first magnet 24, the magnets that are erroneously assembled are replaced. Subsequently, all of the first magnets 24 and the second magnets 26 are fixed to the rotor core 22 using a resin adhesive, etc., whereby the target rotor 12 is manufactured.

As described above, in the manufacturing method of the rotor 12 according to the present embodiment, the distinguishing step in step SS3 is performed with the first magnets 24 and the second magnets 26 assembled in the first and second assembly holes 32, 34 of the rotor core 22, and then whether the first magnets 24 and the second magnets 26 are respectively inserted into the first assembly holes 32 and the second assembly holes 34 in accordance with the arrangement pattern is distinguished. Specifically, whether the first magnet 24 is inserted into the first assembly hole 32 and the second magnet 26 is inserted into the second assembly hole 34 are distinguished. When the magnet inserted into the first assembly hole 32 is determined to be the second magnet 26, and the magnet inserted into the second assembly hole 34 is determined to be the first magnet 24, the second magnet 26 and the first magnet 24 are replaced in step SS4. Therefore, erroneous assembly of the first magnet 24 and the second magnet 26 can be appropriately suppressed similar to the embodiment above.

Next, another embodiment of the present disclosure will be described. In the following embodiment, the parts substantially common to the above embodiment are designated by the same reference signs, and detailed description thereof will be omitted.

Figure 10:
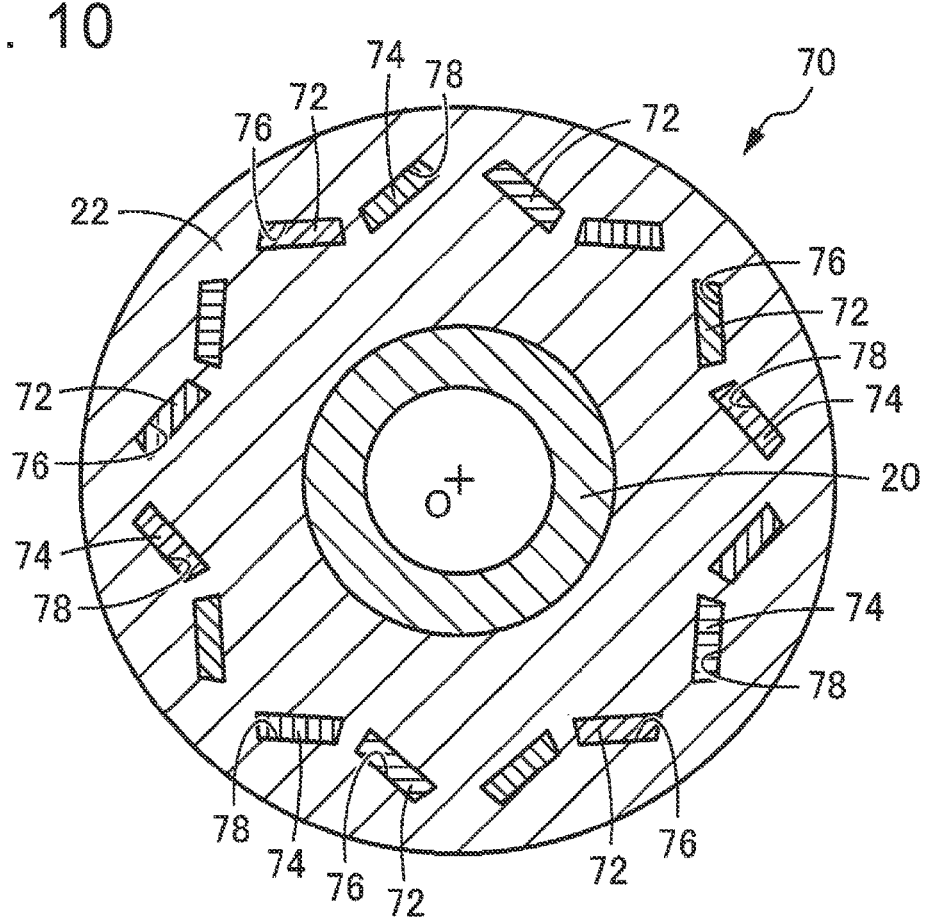
FIG. 10 is a diagram illustrating another example of the rotor and is a sectional view corresponding to FIG. 2.
Figure 11:
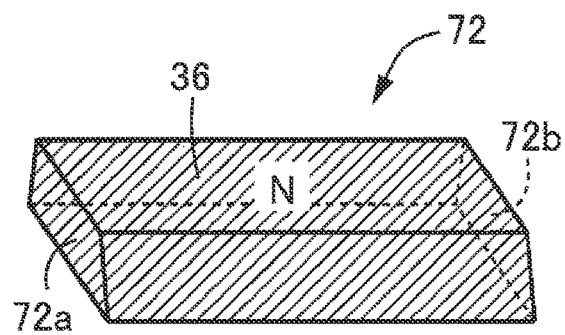
FIG. 11 is a perspective view illustrating the first magnet assembled to the rotor shown in FIG. 10.
Figure 12:
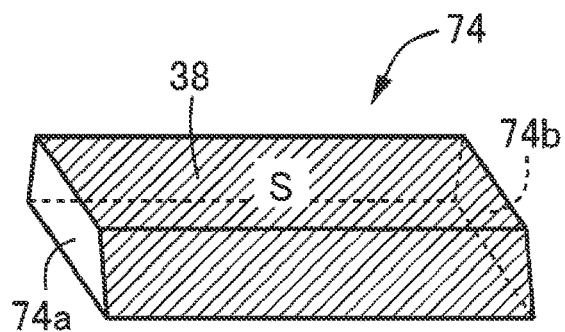
FIG. 12 is a perspective view illustrating the second magnet assembled to the rotor shown in FIG. 10.

FIG. 10 is a sectional view of a rotor 70 corresponding to FIG. 2. FIG. 11 is a perspective view of a first magnet 72 assembled to the rotor 70. FIG. 12 is a perspective view of a second magnet 74 assembled to the rotor 70. The rotor 70 differs from the embodiment above in that sectional shapes of the first magnet 72 and the second magnet 74 each have a trapezoidal sectional shape orthogonal to the axial direction, and a first assembly hole 76 and a second assembly hole 78 to which the first magnet 72 and the second magnet 74 are respectively assembled each have a trapezoidal sectional shape. The first magnet 72 and the second magnet 74 have the same sectional shape and outer peripheral shape, and the first assembly hole 76 and the second assembly hole 78 have the same sectional shape. The first magnet 72 and the second magnet 74 are respectively inserted into the first assembly hole 76 and the second assembly hole 78 in a posture in which a surface on the upper bottom side in the trapezoidal section is located on the outer peripheral side of the rotor core 22. Further, the first magnet 72 and the second magnet 74 have the same magnetic flux and holding force. However, the first magnet 72 and the second magnet 74 have different polarities from each other in a plate thickness direction. For example, the surface on the upper bottom side of the trapezoidal section of the first magnet 72 is the N pole, and the surface on the upper bottom side of the trapezoidal section of the second magnet 74 is the S pole.

Further, also in the rotor 70 described above, the sectional shapes orthogonal to the axial direction and the outer peripheral shapes of the first magnet 72 and the second magnet 74 are the same, and the first magnet 72 and the second magnet 74 cannot be distinguished from each other based on the sectional shape and the outer peripheral shape. Therefore, there is still a possibility of erroneous assembly. Therefore, the insulating coatings 36, 38 are provided on the first magnet 72 and the second magnet 74 such that the insulating coating 36 is provided to cover the entire outer peripheral surface of the first magnet 72 including end faces 72a, 72b on respective sides of the first magnet 72 in an axial direction, and the insulating coating 38 is provided to cover the outer peripheral surface of the second magnet 74 excluding end faces 74a, 74b on respective sides of the second magnet 74 in the axial direction. The first magnet 72 is an example of one magnet, and the second magnet 74 is an example of the other magnet.

Also in the present embodiment, the electrical resistance is measured by bringing the electrodes into contact with the end faces 72a, 72b of the first magnet 72 and the end faces 74a, 74b of the second magnet 74, whereby whether the magnet is the first magnet 72 or the second magnet 74 can be distinguished based on the difference in the electrical resistance caused by whether the insulating coatings 36, 38 are provided. Accordingly, an effect similar to the embodiment above in which, even when the two types of magnets, namely, the first magnet 72 and the second magnet 74, have the same sectional shape and outer peripheral shape, the first magnet 72 and the second magnet 74 can be appropriately distinguished from each other and respectively assembled in the first assembly hole 76 and the second assembly hole 78 of the rotor core 22, which eliminates the restrictions such as the sectional shapes of the first magnet 72 and the second magnet 74 can be obtained.

Note that, the sectional shapes of the first magnet 72 and the second magnet 74 do not necessarily have to be trapezoidal, and can be changed as appropriate. Further, two types of magnets, namely, the first magnet 72 and the second magnet 74, having different magnetic flux and holding force as well as the NS polarity, may also be used.

Figure 13:
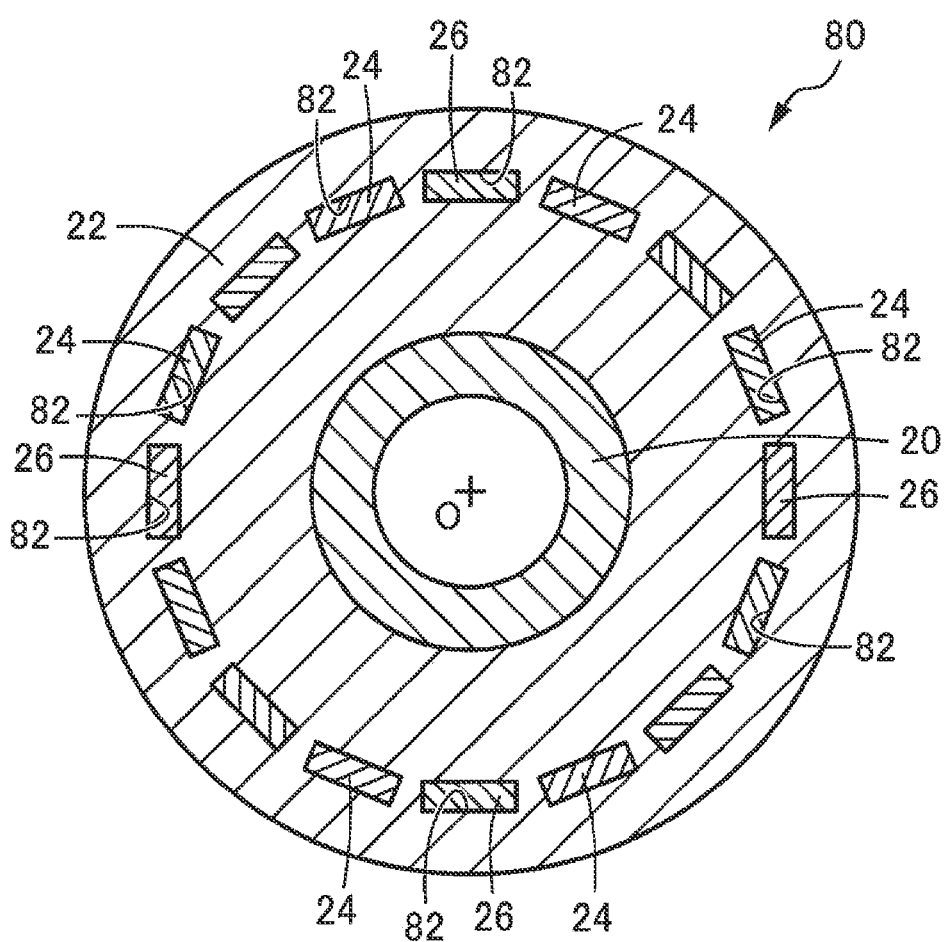
FIG. 13 is a diagram illustrating still another example of the rotor and is a sectional view corresponding to FIG. 2.

FIG. 13 is a sectional view of a rotor 80 corresponding to FIG. 2. In the rotor 80, with a configuration in which a large number of (16 in the present embodiment) assembly holes 82, each of which has a rectangular sectional shape as those of the first assembly hole 32 and the second assembly hole 34 above, are provided at equal angle intervals in the circumferential direction in a constant posture orthogonal to the radial direction of the rotor core 22, two types of magnets, namely, the first magnets 24 and the second magnets 26, are inserted into and assembled in the assembly holes 82 in accordance with the predetermined arrangement pattern. Specifically, two types of magnets, namely, the first magnet 24 and the second magnet 26, are inserted into and assembled in the assembly holes 82 alternately in the circumferential direction. Also in this case, there is a possibility of erroneous assembly because the first magnet 24 and the second magnet 26 have the same sectional shape and outer peripheral shape and thus the first magnet 24 and the second magnet 26 cannot be distinguished from each other based on the sectional shape and the outer peripheral shape. Even in this case, an effect similar to the embodiment above can be obtained by making it possible to distinguish whether the magnet is the first magnet 24 or the second magnet 26 based on the difference in the electrical resistance caused by whether the insulating coatings 36, 38 are provided, using the first magnet 24 and the second magnet 26 that differ from each other in that the insulating coating 36 is provided for the end faces 24a, 24b and the insulating coating 38 is not provided for the end faces 26a, 26b.

The rotor 80 can be configured to have, as the assembly holes 82 above, assembly holes each having a trapezoidal sectional shape similar to the first assembly holes 76 and the second assembly holes 78 shown in FIG. 10, and to use the first magnets 72 and the second magnets 74 each having trapezoidal sectional shape.

Although the embodiments of the present disclosure have been described in detail with reference to the drawings, the above description is merely an example, and the present disclosure can be implemented in various modified and improved modes based on the knowledge of those skilled in the art.

What is claimed is:

1. A rotor of a rotating machine, comprising:
   a rotor core in which a plurality of assembly holes is provided in an axial direction; and
   two types of magnets including a first magnet and a second magnet assembled to the rotor core by being inserted into the assembly holes in accordance with a predetermined arrangement pattern, an outer peripheral surface of any one of the first magnet and the second magnet, including end faces in the axial direction, being entirely covered with an insulating coating, and an outer peripheral surface of the other of the first magnet and the second magnet, excluding at least a part of end faces in the axial direction, being covered with an insulating coating.

2. A manufacturing method of a rotor of a rotating machine including a rotor core in which a plurality of assembly holes is provided in an axial direction, and two types of magnets including a first magnet and a second magnet assembled to the rotor core by being inserted into the assembly holes in accordance with a predetermined arrangement pattern, the manufacturing method comprising:
   preparing the first magnet and the second magnet, each of an outer peripheral surface of the first magnet and an outer peripheral surface of the second magnet being covered with an insulating coating such that the outer peripheral surface of one magnet, including end faces in the axial direction, is entirely covered with the insulating coating and the outer peripheral surface of the other magnet is covered with the insulating coating excluding at least a part of end faces in the axial direction, the one magnet being one of the first magnet and the second magnet and the other magnet being the other of the first magnet and the second magnet; and
   distinguishing the first magnet and the second magnet from each other based on a difference in an electrical resistance caused by whether the insulating coating is provided by bringing an electrode into contact with a portion of the end faces in the axial direction, the portion of the end faces being covered with the insulating coating for the one magnet but not covered with the insulating coating for the other magnet, and measuring the electrical resistance, for both of the first magnet and the second magnet.

3. The manufacturing method according to claim 2, further comprising inserting the first magnet and the second magnet into the assembly holes in accordance with the predetermined arrangement pattern based on a distinguishing result obtained by the distinguishing.

4. The manufacturing method according to claim 2, further comprising replacing, wherein:
   the distinguishing is performed in a state where the first magnet and the second magnet are inserted into the assembly holes of the rotor core, and includes distinguishing whether the first magnet and the second magnet are respectively inserted into the assembly holes in accordance with the predetermined arrangement pattern; and
   the replacing is replacing, with a magnet that is appropriate, the first magnet or the second magnet that is distinguished that it is not inserted into one of the assembly holes in accordance with the predetermined arrangement pattern in the distinguishing.

5. The manufacturing method according to claim 2, wherein the preparing includes adhering the insulating coating to the outer peripheral surface of each of the first magnet and the second magnet such that the insulating coating is not adhered to at least a part of the end faces of the other magnet, of the first magnet and the second magnet, in the axial direction.

6. The manufacturing method according to claim 2, wherein the preparing includes removing at least a part of the insulating coating on the end faces in the axial direction, of the other magnet of the first magnet and the second magnet having the outer peripheral surface that is entirely covered with the insulating coating.

7. The manufacturing method according to claim 2, wherein the first magnet and the second magnet have the same sectional shape orthogonal to the axial direction, and all the assembly holes have the same sectional shape.

8. The manufacturing method according to claim 7, wherein:
- the assembly holes include two types of assembly holes including a first assembly hole and a second assembly hole;
- the first assembly hole and the second assembly hole have mutually different postures with respect to a radial direction of the rotor core and are provided adjacent to each other in a circumferential direction of the rotor core;
- a plurality of sets of the first assembly hole and the second assembly hole is provided around a rotation axis of the rotor core; and
- the first magnet is inserted into the first assembly hole, and the second magnet is inserted into the second assembly hole.

\* \* \* \* \*